Nov. 20, 1962     D. PARRETT     3,064,434
MASTER CYLINDER
Filed May 5, 1961     2 Sheets-Sheet 1
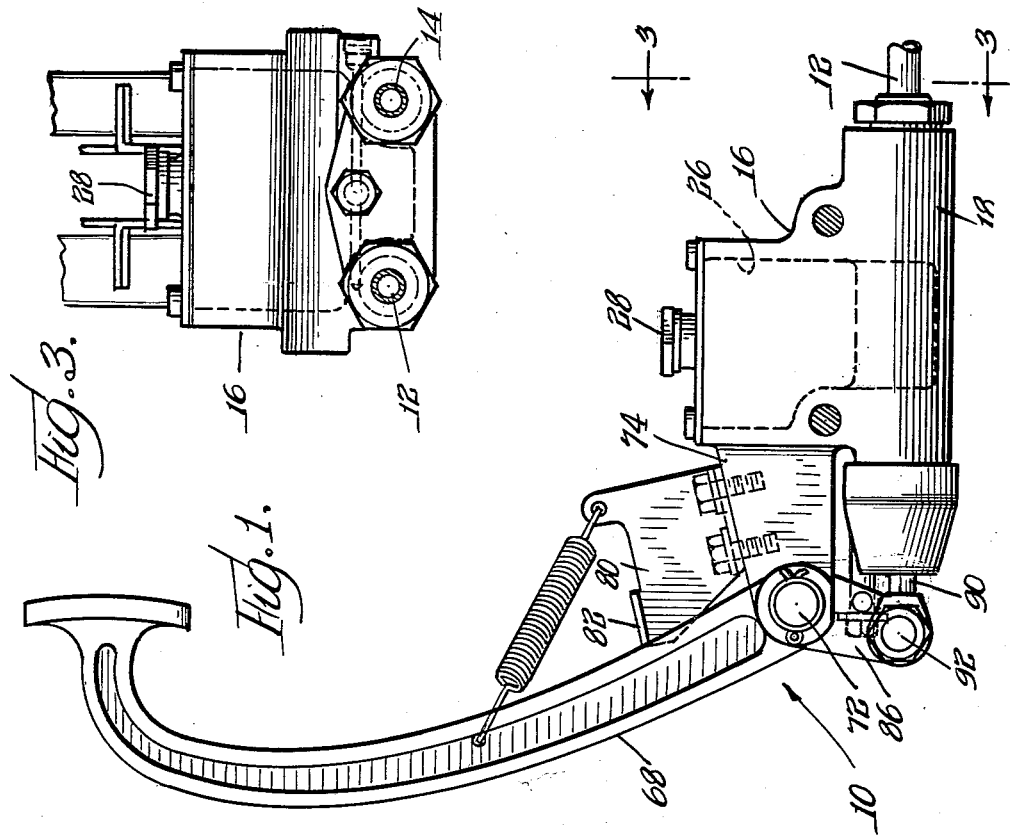
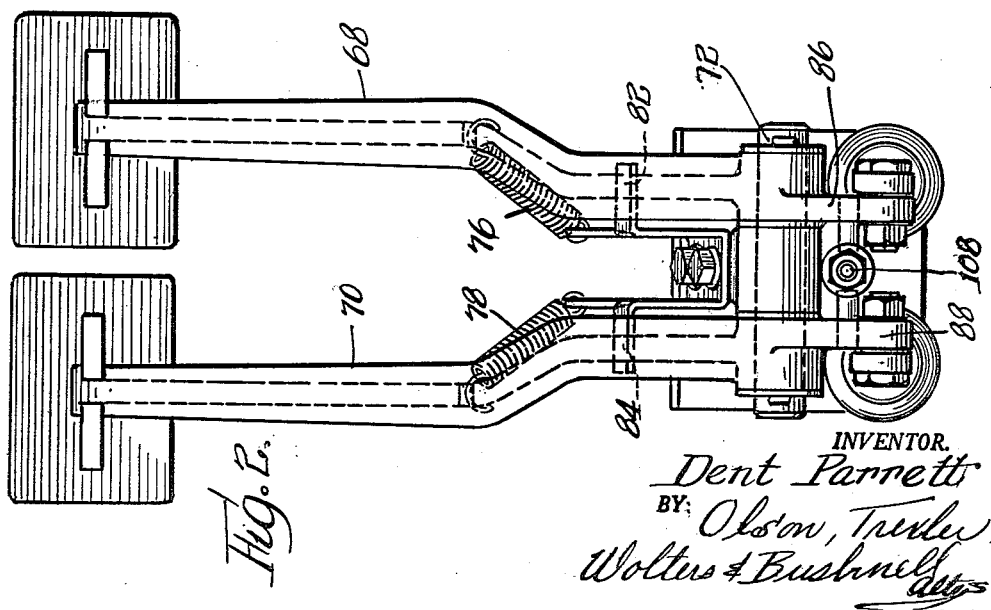
INVENTOR.
Dent Parrett
BY: Olson, Trexler
Wolters & Bushnell Nov. 20, 1962   D. PARRETT   3,064,434
MASTER CYLINDER
Filed May 5, 1961   2 Sheets-Sheet 2
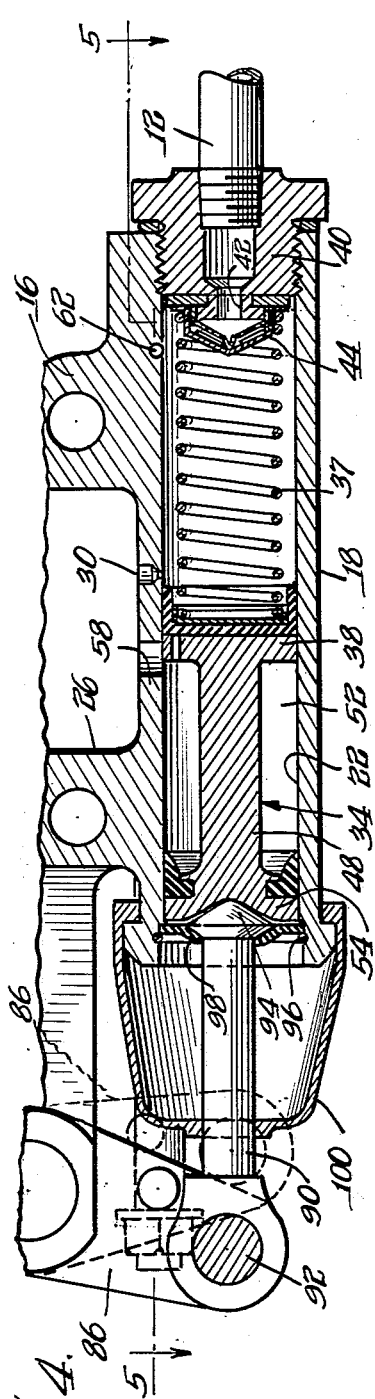
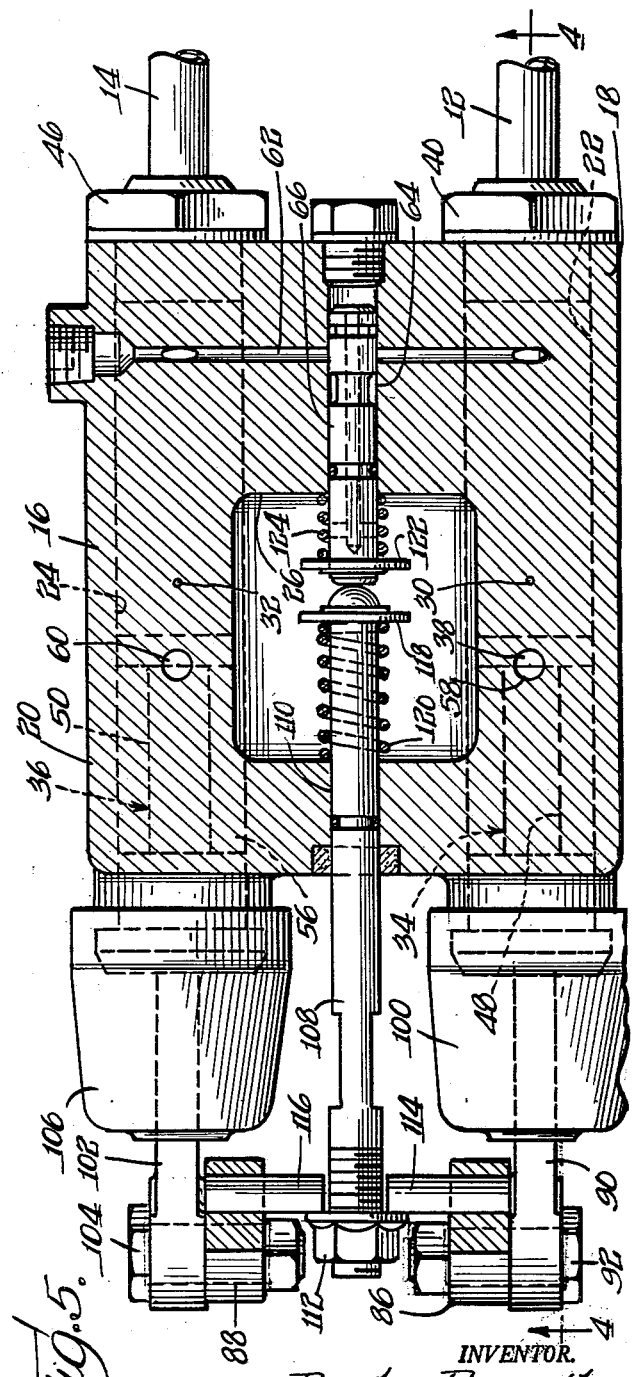
INVENTOR.
Dent Parrett
BY: Olson, Trexler
Wolters & Bushnell ATTYS.

United States Patent Office 3,064,434
Patented Nov. 20, 1962

3,064,434
MASTER CYLINDER
Dent Parrett, St. Joseph, Mich., assignor, by mesne assignments, to Lambert Brake Corporation, St. Joseph, Mich., a corporation of Michigan
Filed May 5, 1961, Ser. No. 108,186
11 Claims. (Cl. 60—54.6)

The present invention relates to a novel fluid pressure control structure, and more particularly to a novel master cylinder structure for controlling the operation of a plurality of actuating cylinders and the like.

While various uses for the structure of the present invention may suggest themselves, it is particularly suitable for use in brake systems to be installed in vehicles such as certain tractors, airplanes and the like. In such vehicles, the brake systems are frequently constructed so that the wheels may be individually braked, if desired, for steering purposes and the like. Such systems are further constructed so that the separate brake units controlling the various wheels may be simultaneously operated if desired. In order to accomplish these results, it has heretofore been proposed to provide separate brake pedals associated with separate master cylinders, which pedals may be individually manipulated and are located immediately adjacent each other so that they may also be readily depressed simultaneously when desired. When such pedals are operated in unison in heretofore been proposed systems, the different brake units may be unequally actuated since the units may have substantially different running clearances or be worn materially different amounts. As a result, one of the brake units may be excessively energized while another brake unit may be inadequately energized so that the vehicle may be caused to swerve.

An important object of the present invention is to provide a novel master cylinder structure which may be selectively operated for independently energizing a plurality of actuating cylinders or the like and which further may be operated for simultaneously and uniformly energizing such actuating cylinders or similar devices.

A more specific object of the present invention is to provide a novel master cylinder structure capable of independently or simultaneously energizing a plurality of actuating cylinders and the like in a manner so as substantially to equalize the pressure of fluid delivered for energizing the actuating cylinders when such cylinders are simultaneously energized.

A further object of the present invention is to provide a novel master cylinder structure of the above described type which is efficient and reliable in operation and which may be economically produced and installed.

Other objects and advantages of the present invention will be come apparent from the following description and the accompanying drawings wherein:

FIG. 1 is a side elevational view showing a master cylinder structure incorporating features of the present invention;

FIG. 2 is a left hand end elevational view of the structure shown in FIG. 1;

FIG. 3 is a fragmentary sectional view taken along line 3—3 in FIG. 1;

FIG. 4 is a partial sectional view taken generally along line 4—4 in FIG. 5; and FIG. 5 is a partial sectional view taken generally along line 5—5 in FIG. 4.

Referring now more specifically to the drawings wherein like parts are designated by the same numerals throughout the various figures, a master cylinder unit or structure 10 incorporating features of the present invention is shown in its entirety in FIGS. 1 and 2. The unit 10 is adapted to be installed in a known manner in a vehicle, such as a tractor, airplane or the like and is adapted to be connected by means of conduits 12 and 14 with separate brake units, not shown, of known construction.

The unit 10 comprises a main body 16 which may be cast or otherwise formed. The body 16 includes a pair of elongated substantially parallel cylinder portions 18 and 20 respectively having elongated axially extending bores 22 and 24 and a chamber 26 which provides a reservoir for hydraulic fluid. The reservoir may be filled with a suitable hydraulic fluid upon the removal of a suitable cap or plug element 28 shown in FIGS. 1 and 3. Apertures 30 and 32 respectively intersect approximately midportions of the bores 20 and 22 and serve to establish communication between the cylinder bores and the reservoir 26.

Pistons 34 and 36 are respectively slidably disposed in the cylinder bores 22 and 24. As shown in FIG. 4, a compression spring 37 is disposed between a head end portion 38 of the piston 34 and a plug 40 closing one end of the cylinder bore 22 for yieldably biasing the piston toward the retracted position. Means described in detail below is provided for actuating or shifting the piston 34 forwardly or toward the right hand end of the cylinder as viewed in FIG. 4. During such movement of the piston, the aperture 30 is blocked and fluid is then forced out through an opening 42 in the plug or fitting 40 and the conduit 12 for energizing the brake unit, not shown. Preferably a check valve assembly 44 is provided across the aperture or passageway 42 for retarding or restricting return flow of fluid from the brake unit and into the master cylinder bore in the desired manner. It is to be understood that a spring corresponding to the spring 37 is disposed in the cylinder bore 24 between the piston disposed therein and an end fitting 46 at the outer end of the bore. In addition, a check valve assembly identical to the valve assembly 44 is disposed in the bore 24.

As shown in FIGS. 4 and 5, the pistons 34 and 36 are provided with reduced diameter portions 48 and 50 between enlarged opposite end portions. As shown best in FIG. 4, an annular chamber 52 results around the elongated reduced diameter portion 48 of the piston 34 and between the enlarged forward end portion 38 and the enlarged trailing end portion 54 of this piston. A similar annular chamber 56 encircles the reduced diameter portion of the piston 36 as indicated in FIG. 5. Apertures 58 and 60 are formed in the body member 16 for establishing communication between the fluid reservoir 26 and the annular chambers 52 and 56. The apertures 58 and 60 are preferably substantially larger than the above mentioned apertures 30 and 32 so that fluid may flow relatively freely between the reservoir 26 and the chambers 52 and 54. Thus, fluid which may leak past the forward or head end portions of the pistons may be readily returned to the reservoir and will not interfere with the proper operation of the pistons.

As indicated hereinabove, an important feature of the present invention resides in the provision of structure whereby the pistons 34 and 36 may be separately and independently operated or alternatively, they may be simultaneously operated and the pressure of fluid delivered through the lines 12 and 14 to the brake units will be equalized. More specifically, a transverse passageway 62 is formed in the body 16 so that it intersects the cylinder bores 22 and 24 adjacent the outlet ends thereof as shown in FIGS. 4 and 5. The passageway 62 also intersects a bore 64 which is located between the bores 22 and 24 and is parallel thereto. A valve element or spool 66 is axially slidably disposed in the bore 64 selectively for blocking and unblocking the passageway 62.

In order to actuate and control the pistons 34 and 36 and the valve 66, means is provided which includes a pair of operating levers or foot pedals 68 and 70 pivotally supported by a shaft 72 mounted in a bracket portion 74 of the body member 16. Springs 76 and 78 are connected between upper end portions of the foot pedals 68 and 70 respectively and ears of a bracket member 80 which is fastened to and projects upwardly from the bracket portion 74 of the body member. The bracket member 80 includes laterally projecting flanges 82 and 84 which, as shown in FIGS. 1 and 2, provide abutments or stops engageable with the foot pedals 68 and 70 for positively limiting upward movement of the pedals at predetermined retracted positions.

The pedals 68 and 70 respectively include relatively short lever portions 86 and 88 which extend generally downwardly from the pivot shaft 72 at locations generally behind the master cylinder portions 18 and 20. A link or rod 90 is connected to the lever arm 86 by pin 92 and is associated with the piston 34 as shown best in FIGS. 4 and 5. The link or push rod 90 is provided with an enlarged pointed or conical end portion 94 for engagement with the end portion 54 of the piston. The piston end portion 54 is formed with a seat 96 for accommodating the end portion of the push rod, which seat has generally conical side walls flaring at a greater angle than the generally corresponding surfaces of the push rod end portion 94 so as to promote limited contact between the end portion 94 and the seat 96 substantially at the central axis of the piston for promoting smooth efficient operation of the piston regardless of the misalignment between the piston and the push rod 90 which occurs when the trailing end of the rod 90 is moved through an arch upon pivotal movement of the lever arm 86. A resilient seal 98 is provided between the end of the master cylinder portion 18 and the rod 90 and preferably this end portion of the master cylinder and a substantial portion of the rod are enclosed by a cap member 100 for preventing the entry of dirt or other foreign material into the cylinder.

A link or rod 102 is pivotally connected with the lower end of the lever arm 88 by a pin 104 as shown best in FIG. 5. The rod 102 is associated with and adapted to actuate the piston 36 in the same manner as the rod 90 is associated with and adapted to actuate the piston 34, and the rod 102 and the piston 36 respectively include portions corresponding to the enlarged conical end portion 94 and the seat 96 described above. Furthermore, the rod 102 is encircled by a seal element corresponding to the above described seal element 98, and is substantially enclosed by a cap member 106 corresponding to the cap member 100.

An axially slidable valve control rod 108 shown best in FIG. 5 is disposed in a bore 110 formed in the body member 116 and aligned with the bore 64. The rod 108 has one end portion which extends into the fluid reservoir 26 and engages an end portion of the valve element 66 which also extends into the fluid reservoir. An opposite end portion of the rod 108 extends rearwardly from the body member 16 to a location between the lever arms 86 and 88. An abutment which in the embodiment shown is in the form of a nut 112 is provided on the outer end of the rod 108 for engagement with transversely extending retaining or locating pins 114 and 116 which are respectively secured to and project from the lever arms 86 and 88. A radially projecting abutment 118 in the form of a washer or the like is suitably secured to an inner end portion of the rod 108 and a spring 120 is disposed between the abutment 118 and a wall of the reservoir 26 for resiliently biasing the rod 108 toward the right as viewed in FIG. 5. A similar abutment washer 122 is fixed to the innermost end of the valve element 66. A spring 124 is compressed between the abutment 122 and a wall of the reservoir 126 for normally biasing the valve element 66 toward the left as viewed in FIG. 5.

With the structure described above, the actuating levers or foot pedals 68 and 70 are normally retained in the retracted positions shown in FIG. 1 so that the push rods 90 and 102 and the locating pins 114 and 116 are also normally located in their retracted positions shown in the drawings. As a result, the actuating pistons are also normally positioned in retracted locations by their associated springs. Furthermore, the pins 114 and 116 engage the abutment element 112 so that the valve control rod 108 is retained in a retracted position with the spring 120 under compression and the valve element 66 is urged by its associated spring 124 against the retracted end of the rod 108 so that the valve element is disposed for blocking the passageway 62 as shown in FIG. 5.

When an operator wishes to actuate only one of the master cylinder pistons, the lever or foot pedal associated with the desired piston is depressed while the other foot pedal is left in its raised or retracted position. Assuming that the piston to be operated is the piston 34, the lever 68 is depressed so that the rod 90 advances and pushes the piston 34 forwardly. It is to be noted that at the same time the lever arm 86 moves toward the broken line position shown in FIG. 4 and carries with it the locating or retaining pin 114. It will be apparent that as the locating pin 114 is moved forwardly, it no longer serves to retain the abutment 112. However, the abutment is still in engagement with and retained by the pin 116 so that the rod 108 is retained in its retracted position and the valve element 66 continues to block the passageway 62. Of course, the same result would be obtained in the event that the master piston 36 were operated while the piston 34 was retained in a retracted position.

When it is desired to actuate both of the master pistons simultaneously, the operator presses down on both of the foot pedals 68 and 70 which are located closely adjacent to each other for facilitating such simultaneous operation. When the pedals are simultaneously depressed, it is to be noted that not only will the pistons 34 and 36 be simultaneously advanced, but also the pins 114 and 116 will be simultaneously advanced toward the broken line position shown in FIG. 4. As a result neither pin serves to retain the rod 108 in the retracted position and the compression spring 120 which is stronger than the spring 124 acts to shift the rod 108 and the valve element 66 toward the right as viewed in FIG. 5 until a reduced diameter portion 118 of the valve element is aligned with the passageway 62 so as to unblock the passageway and permit fluid to flow therethrough. With the passageway 62 unblocked, fluid may flow freely between the master cylinder bores 22 and 24 so as to equalize the pressure therein during simultaneous operation of the pistons. Thus, the brake units being simultaneously energized by the master cylinder structure will be energized with the same fluid pressure regardless of whether or not the units are worn or adjusted differently. Further, this transfer of fluid between the master cylinders enables the master pistons and the foot pedals to move in unison to the same distances while different volumes of fluid are delivered to the different brake units in accordance with the requirements thereof.

While the preferred embodiment of the present invention has been shown and described herein, it is obvious that many structural details may be changed without departing from the spirit and scope of the appended claims.

The invention is claimed as follows:

1. A structure of the type described comprising first and second master cylinder means for delivering fluid under pressure and respectively connectable with first and second units to be actuated, connecting means associated with said first and second cylinder means selectively for permitting transfer between fluids acted upon by said first and second cylinder means and for preventing such transfer of fluids, said connecting means comprising a single passageway for conducting fluid back and forth between said first and second cylinder means and a single valve element for blocking and unblocking said passageway, and means selectively for independently operating said first and second cylinder means and controlling said valve element for preventing said transfer of fluids and for simultaneously operating said cylinder means and controlling said valve element for permitting said transfer of fluids.

2. A structure of the type described comprising first and second master cylinder means for delivering fluid under pressure and respectively connectable with first and second units to be actuated, connecting means associated with said first and second cylinder means selectively for permitting transfer between fluid acted upon by said first and second cylinder means and for preventing such transfer of fluids, means selectively for independently operating said first and second cylinder means and for controlling said connecting means for preventing said transfer of fluids and for simultaneously operating said cylinder means and controlling said connecting means for permitting said transfer of fluids, said connecting means comprising a fluid passageway, and a valve element shiftable between first and second positions respectively for blocking and unblocking said passageway, and said operating and control means including means for locating said valve element at said first position when the master cylinders are independently operated and for locating said valve element at said second position when said master cylinders are simultaneously operated.

3. A master cylinder structure of the type described comprising first and second master cylinder bore means respectively connectable with first and second units to be actuated, first and second piston means respectively axially slidably disposed in said first and second bore means operable for delivering fluid under pressure from said bore means, passageway means connecting said first and second bore means for permitting transfer of fluid therebetween, a valve element shiftable between first and second positions respectively for blocking and unblocking said passageway means, and means selectively for independently operating said first and second piston means and locating said valve element in said first position and for simultaneously operating said piston means and locating said valve element in said second position.

4. A structure, as defined in claim 3, wherein said first and second piston means and said valve element are disposed for movement along parallel axes.

5. A structure, as defined in claim 3, wherein said operating and control means comprises means resiliently biasing said valve element toward said second position, relatively movable operating members respectively associated with said first and second piston means, and locating elements on and movable with said members and controlling said resilient biasing means.

6. A master cylinder structure of the type described comprising a body member including elongated substantially parallel first and second master cylinder bore means therein, means providing first and second outlet openings respectively for said first and second bore means and connectable with first and second units to be operated, first and second piston means respectively slidably disposed in said first and second bore means and operable for delivering fluid under pressure through said outlet openings, passageway means in said body member and connecting said first and second bore means for permitting transfer of fluid therebetween, additional bore means in said body means and intersecting said passageway means, a valve element shiftably disposed in said last mentioned bore means for movement between first and second positions respectively for blocking and unblocking said passageway means, first and second pivotally supported and independently operable lever members respectively operatively connected with said first and second piston means selectively for independently operating and simultaneously operating said first and second piston means, and means controlled by said operating members for locating said valve element in said second position when said operating members are actuated for simultaneously operating said piston means and for locating said valve element in said first position when said operating members are actuated for independently operating said piston means.

7. A structure, as defined in claim 6, wherein said body member comprises chamber means providing a fluid reservoir, and aperture means in said body member connecting said reservoir and said first and second bore means.

8. A structure, as defined in claim 6, wherein said passageway means connects said first and second bore means at locations adjacent said outlet openings thereof.

9. A structure, as defined in claim 6, wherein said last mentioned bore means is disposed substantially parallel to said first and second bore means, said valve element being axially shiftable within said last mentioned bore means, and said means controlled by said operating members for locating said valve element at said first and second positions comprises a control member separate from and engageable with said valve element, spring means associated with said valve element for urging the valve element toward said first position, second spring means of greater strength than said first mentioned spring means associated with said control member for urging said control member against said valve element for biasing the valve element toward said second position, and means interconnecting said control member and said operating members for retaining said control member against movement under the influence of said second spring means until said operating members are actuated for simultaneously operating said first and second piston means.

10. A structure, as defined in claim 9, wherein said body member comprises a chamber providing a fluid reservoir, and aperture means connecting said reservoir with said first and second bore means, said valve element and said control member including opposing end portions extending into said chamber, and said first mentioned spring means and said second spring means being disposed in said chamber and respectively operatively connected with said end portions of said valve element and said control member.

11. A structure, as defined in claim 6, which includes first and second push rod means respectively pivotally connected to said first and second operating members and engageable with said first and second piston means, spring means in said first and second bore means and resiliently biasing said first and second piston means toward retracted positions, said push rods respectively including end portions having flaring surface means engageable with said piston means, and said first and second piston means respectively including centrally located seats having surfaces flaring at an angle greater than that of the flaring surface means of said rods for promoting engagement of said rod surface means centrally of said surface means of said seats.

References Cited in the file of this patent

UNITED STATES PATENTS

| | | |
|---|---|---|
| 2,395,811 | Griffith | Mar. 5, 1946 |
| 2,741,337 | Ziskal | Apr. 10, 1956 |